United States Patent
Baxter et al.

(10) Patent No.: US 7,490,215 B2
(45) Date of Patent: Feb. 10, 2009

(54) MEDIA MEMORY SYSTEM AND METHOD FOR PROVIDING CONCURRENT MEMORY ACCESS TO A PLURALITY OF PROCESSORS THROUGH SEPARATE TRANSLATION TABLE INFORMATION

(75) Inventors: Brent S. Baxter, Hillsboro, OR (US);
Prashant Sethi, Folsom, CA (US);
Clifford D. Hall, Orangeville, CA (US);
William H. Clifford, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 11/022,503

(22) Filed: Dec. 22, 2004

(65) Prior Publication Data
US 2006/0136693 A1 Jun. 22, 2006

(51) Int. Cl.
*G06F 12/00* (2006.01)
(52) U.S. Cl. .................................. 711/206; 711/150
(58) Field of Classification Search .................. 711/168
See application file for complete search history.

(56) References Cited

U.S. PATENT DOCUMENTS

| | | | |
|---|---|---|---|
| 4,270,167 A * | 5/1981 | Koehler et al. ............... 710/112 |
| 5,727,179 A * | 3/1998 | Dei ............................. 711/206 |
| 5,794,060 A * | 8/1998 | Hansen et al. ................... 712/1 |
| 5,896,501 A * | 4/1999 | Ikeda et al. .................. 709/216 |
| 6,049,853 A | 4/2000 | Kingsbury et al. |
| 6,286,092 B1 | 9/2001 | Frank et al. |
| 6,658,477 B1 * | 12/2003 | Lisitsa et al. ................. 709/231 |
| 6,684,305 B1 | 1/2004 | Deneau |
| 6,891,543 B2 * | 5/2005 | Wyatt ........................ 345/541 |

FOREIGN PATENT DOCUMENTS

| WO | WO 02/086730 A2 | 10/2002 |
|---|---|---|
| WO | WO02086730 A2 * | 10/2002 |

OTHER PUBLICATIONS

Rutten et al., "Design of Multi-Tasking Coprocessor Control for Eclipse", Proceedings of the Tenth International Symposium on Hardware/Software Codesign, May 2002, ACM Press, pp. 139-144.*
PCT International Search Report (dated Jun. 20, 2006), International Application No. PCT/US2005/046303—International Filing Date Dec. 20, 2005 (10 pages).

* cited by examiner

*Primary Examiner*—B. James Peikari
(74) *Attorney, Agent, or Firm*—Molly A. McCall

(57) ABSTRACT

A method and apparatus for matching parent processor address translations to media processors' address translations and providing concurrent memory access to a plurality of media processors through separate translation table information. In particular, a page directory for a given media application is copied to a media processor's page directory when the media application allocates memory that is to be shared by a media application running on the parent processor and media processors.

19 Claims, 3 Drawing Sheets

MEDIA MEMORY SYSTEM AND METHOD FOR PROVIDING CONCURRENT MEMORY ACCESS TO A PLURALITY OF PROCESSORS THROUGH SEPARATE TRANSLATION TABLE INFORMATION

BACKGROUND

Implementations of the claimed invention generally may relate to communication of media information and, more particularly, to memory access for multiple media processors.

Media-capable PC systems require high speed memory systems for both the host CPU and media processor(s). The CPU and media processors may cache frequently used data and address translations. Certain parts of the media processing may be subject to strict frame timing constraints associated with live video and audio, suggesting the need for separately stored address translations. In particular, the CPU and media processors preferably have rapid access to a common memory system to perform their different parts of the media processing and for the various media processing units to synchronize quickly between themselves and the CPU.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Figure 1:
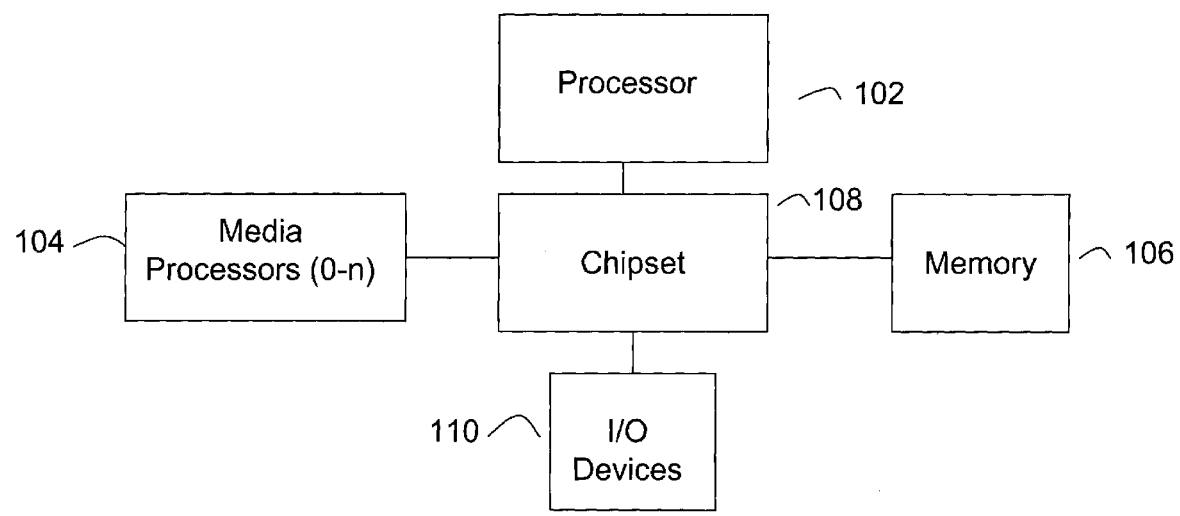
FIG. 1 illustrates an example system in which the invention may be used.

FIG. 1 illustrates an example system. System 100 includes a processor 102, which in one embodiment may be a parent processor (also referred to for descriptive reasons as a "parent" processor). System 100 may also include one or more additional processors 104, which in one embodiment may be referred to as "media" processors (also referred to for descriptive reasons as "additional" processors). The embodiment is not restricted to use with a particular type of processor. Indeed, the embodiment is described in connection with generally understood structures and signals of processors and memories. Processors 102 and 104 may include a general-purpose or a specific-purpose processing device and/or logic. Processor 102 and 104 may be arranged to process media information. Particular embodiments, however, include structures presently used in the Pentium® microprocessor marketed by Intel Corporation and in related chip sets. However, the present invention is not limited to use with the below-recited structure and signals used in the Pentium® processor.

In some implementations, additional processors 104 process media information (and possibly other communication-related information). For the purposes of explanation, the media information transmitted may include video and/or voice information, but the claimed invention is not limited in this regard. System 100 may receive and process other types of media information consistent with the description herein. The media information processed by processors may include video information encoded in a format such as MPEG-1, MPEG-2, MPEG-4, H.264, Windows Media Video version 9 (WMV9), JPEG2000 and Advanced Video System (AVS) formats. The claimed invention is not limited to the formats specifically mentioned herein, rather any now-known or later-developed media format may be used in accordance with the schemes disclosed herein. The media information may also or alternately include other information, such as telephony or other audio information.

Most general purpose microprocessors make use of virtual or demand-paged memory schemes, where sections of a program's execution environment are mapped into physical memory as needed. Virtual memory schemes allow the use of physical memory much smaller in size than the linear address space of the microprocessor, and also provide a mechanism for memory protection so that multiple tasks (programs) sharing the same physical memory cannot adversely interfere with each other. Parent processor 102 communicates with memory 106 via chipset 108. Chipset 108 may also serve as a bridge to other busses, such as peripheral component bus, which connects to media processors 104 and various I/O devices 110.

With most modern computer systems, a microprocessor refers to a location using a linear address, but an object is retrieved from a specific memory location by providing its physical address on an address bus. Linear addresses may be the same as physical addresses, in which case address translation is not required. However, usually a virtual memory scheme is employed in which linear addresses are translated into physical addresses. In this case, a linear address may also be referred to as a virtual address. The linear address space is the set of all linear addresses generated by a microprocessor, whereas the physical address space is the set of all physical addresses.

A virtual or demand-paged memory system may be illustrated as a mapping between a linear (virtual) address space and a physical address space. In a virtual memory system, the linear and physical address spaces are divided into blocks of contiguous addresses, customarily referred to as pages if they are of constant size or are any of several fixed sizes. A typical page size may be 4 KBytes, for example. Example implementations of system 100 may include memory references generated by parent processor 102 and a plurality of additional processors 104 accessing common memory 106, although the claimed invention is not limited in this regard.

Figure 2:
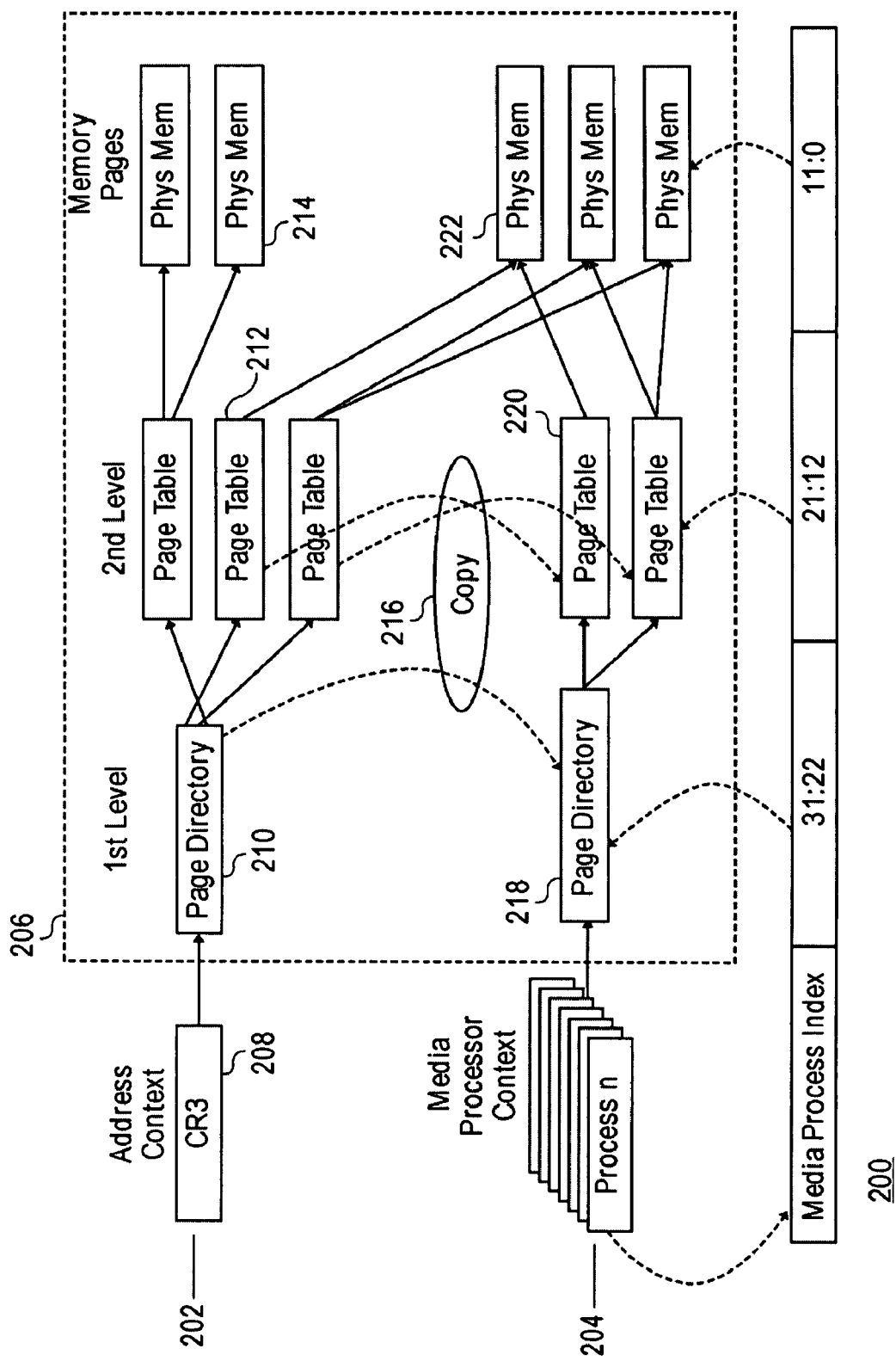
FIG. 2 illustrates an example implementation of a media memory process.

FIG. 2 illustrates an example implementation of a media memory process. in particular, an example relationship between processor 202, additional processors 204, memory 206 and address translation is illustrated. Additional processors 204 may share memory 206 with parent processor 202. For example, in one embodiment, parent processor 202 and additional processors 204 in the form of media processors share the address translation system in situations where media frame timing requirements are less stringent. Parent processor 202 may include a control unit (not shown) which has numerous registers provided therein including a control register 208 such as CR3. Control register 208 contains an address where a page directory is located. Embodiments of the invention maintain the same common data structures and some of the same operating procedures to manage the contents of control register 208. At the same time, a duplicate of the data structures is provided for additional processors 204.

Concurrent memory access for multiple media processors 204 may be provided via separate translation table hardware, each private to a single media application. Since parent processor address translations match the media processor(s)' translations, parent processor 202 may exchange memory pointers without alteration. As discussed in detail below, one way to implement this is to copy the parent processor's page directory for a given media application to the media processor's page directory. This may be done when the media application allocates memory that may be shared by a media application running on parent processor 202 and media processor (s) 204.

The data in either main memory 214 or parent processor or media processor(s)' data caches (not shown) may be retained rather than swapped to disk. Retaining data in main memory 214 constrains the maximum access latency seen by media applications, which allows them to be directly gated by media timing signals. Data may be simultaneously cacheable from the parent processor 202 and media processors 204 without requiring it to be swapped to disk, as in conventional arrangements.

Concurrent memory access allows a media application's forward progress to be gated directly by appropriate media timing signals, such as the display system's vertical retrace signal, or a synchronization signal generated by an incoming TV stream, rather than relying on the parent processor's operating system for these timing services. This may also allow for improved robustness against "dropped video frames" for reduced video buffering which lowers cost, or for reduced media processing latency, which may be important for selected interactive applications and also for simpler designs since media processors 204 do not need pre-emptive scheduling hardware. Concurrent memory access may also eliminate swap overhead that may occur if media processor(s) 204 must run the media application only when the parent application is running on parent processor 202.

Each media memory transaction to access its region of physical memory may be limited, preventing a malfunction in one application from corrupting data belonging to another application. In the event an application generates an out-of-bounds address, the translation system may signal an addressing fault. This may be accomplished in the media processors' memory address translation units where the media process ID selects the proper address translation for that process.

Although systems 100 and 200 in FIGS. 1 and 2 including discrete components, these components may be implemented in hardware, software/firmware, or some combination thereof. When implemented in hardware, some components of systems 100 and 200 may be combined in a certain chip or device.

The mapping shown in FIG. 2 illustrates a generic two-level hierarchical mapping comprising directory tables and page tables. Page directory tables and page tables are stored in physical memory, and are usually themselves equal in size to a page. A page directory table entry (PDE) points to one or more page tables in physical memory, and a page table entry (PTE) points to a page in physical memory. Parent processor 202 and additional processors 204 share main memory 206. In the first level of mapping, control register 208 points to a page directory. Control register 208 chooses page directory memory 210. In the second level of mapping, entries in page directory 210 point to page tables 212. Entries in those pages point to the actual pages 214 of memory where the user data resides.

Some microprocessors employ several modes for translating linear addresses into physical addresses. In one mode, the first 12 bits of a linear address are used as an offset to a physical address within a page frame, the next 10 bits of the linear address are used as an offset into a page table, and the highest 10 bits of the linear address are used as an offset into a page directory. One skilled in the art will recognize that other modes for translating 32 bit linear addresses may be used as well and the present embodiment is not limited to any particular mode or to a 32 bit linear address.

Embodiments of the invention are directed to the memory system that does address translation. The same or similar data structures and operating procedures to manage the contents of control register 208 are maintained even when parent process 202 is swapped out. in particular, in one embodiment, a duplicate of the data structures is provided for additional processes 204. Data structures include page directories 210 page tables 212 and actual pages 214. Entries in those pages point to the actual pages 214 of memory where the user data is stored. The contents of page tables 212 are stored in any suitable memory component such as main memory 206. Page table directory 210 and page tables 212 are stored in main memory 206 and accessed as described herein.

In a typical implementation, this allows additional processors 204, such as media processors, to have access to memory 206 after parent process 202 is swapped out. Conventionally, when parent process 202 is swapped out, its address mapping is swapped out too and its memory is no longer accessible. For example, in running a video encode stream, media processors 204 may be executing another program as well. When parent processor 202 is swapped out, the address space may become inaccessible for both parent processor 202 and media processors 204. The present embodiment provides media processor address mappings that are persistent, despite parent process 202 being swapped out, to meet real time media processing deadlines.

A shared memory is attached to individual processing engines. Media processor 204 is uninterrupted while the application running on parent processor 202 is swapped out. For example, application running on parent processor 202 may be swapped out so the operating system can run something else on parent processor 202. In particular, a timer based application on Windows operating system was scheduled to run. In another example, an application running on parent processor 202 may be swapped out because the user changed desktop focus. Certain media applications, such as video encode or decode, preferably run uninterrupted to the end of the video frame even if the application on the parent processor 202 must be swapped out.

As shown in FIG. 2, page tables are set up in a copy operation 216. The page directory 210 that was in use before the parent application was swapped out may remain. The parent processor 202 running in the parent processor context then provides an instruction to duplicate address translation data for the media processors 204 in use. For example, media processors 204 run a video application, such as bringing information in from a tuner, processing and playing it back on a television or computer monitor. During this time, some other operation may need to be performed by parent processor 202 such as formatting a floppy disk. Conventionally, the operating system interrupts the media processors 204 so main processor 202 can run the floppy disk utility application. In particular, the operating system halts the application, and reloads control register 208 with a different page table address (or different set of page tables). The application running on additional processors 204 ceases until the operating system resumes executing the original process.

In the present embodiment, the page mappings in the media processor context are not disturbed by changing the contents of control register 208. Media processors 0-n 204 continue processing because they have a valid page directory 218 and valid page tables 220 that still point to physical memory 222 that is accessible even though the top set of page tables 212 (copied during the copy operation 216) have been inactivated.

The page directory 210 and page tables 212 associated with parent processor 202 are reactivated. If the operating system restored the previous contents of control register 208, the process is completed. If not, new information is loaded into the two sets of page tables 212 and 220.

Figure 3:
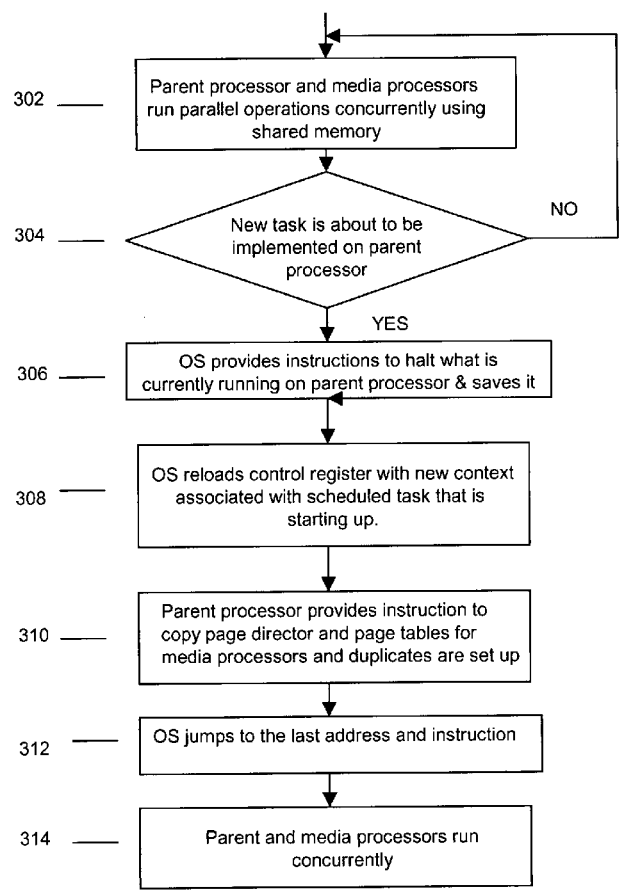
FIG. 3 is a flow chart illustrating an example process of providing a media memory system.

FIG. 3 is a flow chart illustrating a process 300 of providing a media memory system for uninterrupted processing of information by additional processors sharing a memory with a parent processor when a parent processor is interrupted. The application executing on a parent processor can be suspended without disturbing applications running on additional processors. Although process 300 may be described with regard to system 200 shown in FIG. 2 for ease of explanation, the claimed invention is not limited in this regard.

Parent processor 202 and media processors 204 run parallel operations concurrently using shared memory 214 (act 302).

It is then determined whether a new task is about to be implemented on parent processor 202 (act 304). For example, a new task may be detected when the parent processor 202 runs to the end of its timeslot or another higher priority must be run instead.

If act 304 does not detect a new task about to be implemented on parent processor 202, processing continues (act 302). If act 304 detects new task about to be implemented on parent processor 202, operating system may then provide instructions to halt what is currently running on parent processor 202 and save its memory addressing context (act 306).

Operating system may reload control register 208 with new context associated with the scheduled task that is about to start (act 308).

Before transferring to the new tasks, parent processor 202 provides an instruction to copy page directory 210 and page tables 212 for media processors 104 (act 310). Duplicate page directories 218 and page tables 220 are set up in the copy operation (act 312). In particular, page directory 210 and page tables 212 are copied for media processors 204.

The instructions that were about to be executed are known so execution starts at that the last address and instruction. The operating system jumps to the last address and instruction and begins execution (act 312).

Parent processor 202 and additional processors (in media processor context) 204 run concurrently (act 314).

Processors may be implemented, for example, with a conventional processor 202 plus some number of smaller processor cores, corresponding to additional processors 204. Top context would correspond to a single IA 32 processor (or hyper threaded one or multiple of them). CPU and media processors may cache frequently used data and address translation. Certain parts of the media processing may be subject to timing constraints associated with live video and audio suggesting the need for a separately stored address translation.

Although several exemplary implementations have been discussed, the claimed invention should not be limited to those explicitly mentioned, but instead should encompass any device or interface including more than one processor capable of processing, transmitting, outputting, or storing information.

Process 300 may be implemented, for example, in software that may be executed by processors 202 and 204 or another portion of local system 200.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method, comprising:
    matching primary processor address translations to at least one secondary processor address translation;
    providing concurrent shared memory access to at least two secondary processors through separate translation table information, wherein each of the at least two secondary processors maintains separate translation table hardware private to a given application; and
    exchanging real-time data between the primary and at least two secondary processors though the shared memory.

2. The method of claim 1, wherein matching primary processor address translations to at least one secondary processor address translation comprises:
    copying a page directory for the given application to a secondary processor's page directory when the application allocates memory that is to be shared by the application running on the primary and secondary processors.

3. The method of claim 1, further comprising:
    limiting each memory transaction to access a region of physical memory.

4. The method of claim 3, wherein limiting each memory transaction to access its region of physical memory includes:
    signaling an addressing fault in response to an application generating an out of bounds address.

5. The method of claim 1, comprising:
    retaining data in either shared memory, or caches associated with primary processor or secondary processors.

6. The method claimed in claim 1, wherein the at least one secondary processor comprises at least one media processor.

7. The method claimed in claim 6, further comprising:
    executing a real-time part of a media process on at least one media processor.

8. The method claimed in claim 1, further comprising:
    allocating and deallocating memory used to contain real-time media data.

9. The method claimed in claim 1, further comprising:
    synchronizing at least one secondary processor with externally supplied timing signals without delays caused by an operating system.

10. A machine-accessible medium including instructions that, when executed, cause a machine to:
- match first processor address translations to at least one secondary processor address translation;
- enable common memory access to at least two secondary processors through dedicated translation table information, wherein each of the at least two secondary processors maintains separate translation table hardware private to a given application; and
- share data between the first and at least two secondary processors though the common memory.

11. The machine-accessible medium claimed in claim 10, wherein instructions to match first processor address translations to at least one secondary processor address translation further includes instructions that, when executed, cause the machine to:
- copy a page directory for the given application to a secondary processor's page directory when the application allocates memory that is to be shared by the application running on the first and secondary processors.

12. A system, comprising:
- a memory; and
- a controller to match primary processor address translations to at least one secondary processor address translation, provide concurrent shared access to the memory to at least two secondary processors through separate translation table information, wherein each of the at least two secondary processors maintains separate translation table hardware private to a given application, and exchange real-time data between the primary and at least two secondary processors though the memory.

13. The system of claimed in claim 12, the controller copies a page directory for the given application to a secondary processor's page directory when the application allocates memory that is to be shared by the application running on the primary and secondary processors.

14. The system claimed in claim 12, wherein data is retained in memory, or caches associated with primary processor or secondary processors.

15. The system claimed in claimed in claim 12, wherein the controller allocates and deallocates memory used to contain real-time media data.

16. The system claimed in claim 12, further comprising:
- synchronizing at least one secondary processor with externally supplied timing signals without delays caused by an operating system.

17. An apparatus, comprising:
- a address translator device to match primary processor address translations to at least one secondary processor address translation, provide concurrent shared access to the memory to at least two secondary processors through separate translation table information, wherein each of the at least two secondary processors maintains separate translation table hardware private to a given application, and exchange real-time data between the primary and at least two secondary processors though the memory.

18. The apparatus claimed in claim 17, wherein the address translator device copies a page directory for the given application to a secondary processor's page directory when the given application allocates memory that is to be shared by the application running on the primary and secondary processors.

19. The apparatus claimed in claim 17, wherein the address translator device directs data to be retained in either shared memory, or caches associated with a primary processor or secondary processors.

* * * * *